United States Patent
Park et al.

(10) Patent No.: US 6,791,558 B2
(45) Date of Patent: Sep. 14, 2004

(54) METHOD AND APPARATUS FOR PROCESSING PIXEL RASTERIZATION IN THREE-DIMENSIONAL RENDERING PROCESSOR

(75) Inventors: Woo Chan Park, Seoul (KR); Tack Don Han, Seoul (KR); Il San Kim, Seoul (KR); Kil Whan Lee, Seoul (KR); Sung Bong Yang, Seoul (KR)

(73) Assignee: Yonsei University, Seoul (KR)

( * ) Notice: Subject to any disclaimer, the term of this patent is extended or adjusted under 35 U.S.C. 154(b) by 219 days.

(21) Appl. No.: 09/920,209

(22) Filed: Aug. 1, 2001

(65) Prior Publication Data

US 2003/0011594 A1 Jan. 16, 2003

(30) Foreign Application Priority Data

Jul. 12, 2001 (KR) .................................. P2001-41902

(51) Int. Cl.[7] ................................................ G09G 5/36
(52) U.S. Cl. ..................... 345/556; 345/614; 345/582
(58) Field of Search ................................. 345/501–506, 345/519–520, 522, 530–574, 419, 421, 422, 582, 591, 592, 589, 614

(56) References Cited

U.S. PATENT DOCUMENTS 6,002,410 A * 12/1999 Battle .......................... 345/552
6,559,852 B1 * 5/2003 Ashburn et al. ............. 345/533

* cited by examiner

Primary Examiner—Kee M. Tung
(74) Attorney, Agent, or Firm—Sheridan Ross P.C.

(57) ABSTRACT

A method and apparatus for processing pixel rasterization in a 3D rendering processor is disclosed. According to the method and apparatus, the primary depth checking is performed before the performing of the texture mapping, and thus the unnecessary performing of the texture mapping can be removed. Also, the consistency problem can be simply and easily solved using the flag memory, and by performing the depth reading and depth checking twice, the hit rate of the pixel cache memory is heightened. Thus, the method and apparatus is effective in cost, performance, and power consumption.

17 Claims, 4 Drawing Sheets

METHOD AND APPARATUS FOR PROCESSING PIXEL RASTERIZATION IN THREE-DIMENSIONAL RENDERING PROCESSOR

BACKGROUND OF THE INVENTION

1. Field of the Invention

The present invention relates generally to a three-dimensional rendering processor for processing three-dimensional (3D) graphics, and more particularly, to a method and apparatus for processing pixel rasterization in a 3D rendering processor.

2. Background of the Related Art

Currently, a high-performance 3D rendering processor supports a texture mapping, bump mapping, and environment mapping in addition to an interpolation and depth test (or z test) which are the basic function of the processor.

Especially, the texture mapping is the most important barometer when the performance of the 3D rendering processor is measured, and the importance of the bump mapping and environment mapping has been recently highlighted.

Meanwhile, in order to support the texture mapping, a large amount of memory is required as well as a large-scaled hardware, and this is the most important factor in a memory bandwidth problem that is the biggest bottleneck to the design of the rendering processor.

The most important thing in the design of the rendering processor is how to process the texture mapping effectively.

A pixel rasterization processing section of a general 3D graphic rendering processor performs the depth test after performing the texture mapping.

This is called a pre-texturing method, and the biggest defect of this method is that the texture mapping is performed even with respect to the present image that is superimposed and is not shown due to the previously processed image.

Thus, the pre-texturing method should use an unnecessary memory bandwidth, and this causes the whole performance to deteriorate.

Generally, the 3D graphic image has a plurality of depth complexity, and in case that the depth complexity is 3, about 40% of images are thrown away during the depth test.

Here, the depth complexity represents the average number of fragment images corresponding to one pixel position, and the depth test is for determining the depth value of the present fragment image by comparing the depth value of the previously processed fragment image with that of the fragment image to be presently processed.

In this case, if the depth test is performed after the texture mapping, about 40% of the memory bandwidth required for the whole texture mapping is wasted, and the whole performance deteriorates with the greatly increased power consumption caused by the unnecessary performing of hardware.

In order to solve these problems, a post-texturing method has been proposed.

This method requires a wider fragment image queue in comparison to the pre-texturing method.

Here, the fragment image queue means a FIFO (first-in-first-out) queue for processing a pipeline of the pixel rasterization of the rendering processor.

Also, the post-texturing method includes many processing steps between depth reading operation and writing operation to process a transparent texture image.

Due to this, two or more pixels may share the same memory address between the depth reading operation and writing operation.

Accordingly, the post-texturing method may cause a consistency problem.

In order to detect such a consistency problem, an associative logic is required, but selection of this associative logic imposes a great burden on hardware.

Also, except the rendering processor having a built-in frame memory, most rendering processors use a pixel cache memory having depth information and color information.

However, the hit ratio of the pixel cache memory greatly deteriorates in comparison to that of the microprocessor.

SUMMARY OF THE INVENTION

Accordingly, the present invention is directed to a method and apparatus for processing pixel rasterization in a 3D rendering processor that substantially obviates one or more problems due to limitations and disadvantages of the related art.

An object of the present invention is to provide a method and apparatus for processing pixel rasterization in a 3D rendering processor that can remove the unnecessary performing of the texture mapping.

Another object of the present invention is to provide a method and apparatus for processing pixel rasterization in a 3D rendering processor that can simply and easily detect the consistency problem.

Still another object of the present invention is to provide a method and apparatus for processing pixel rasterization in a 3D rendering processor that can greatly reduce the stop of performing the pipeline.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing pixel rasterization in a 3D rendering processor includes the steps of receiving an input of present fragment image information from an outside, primarily checking existence/nonexistence of previous fragment image information corresponding to an address of the inputted present fragment image information, immediately texture-mapping the present fragment image information if the previous fragment image information does not exist as a result of the primary checking, while texture-mapping the present fragment image information after determining a depth value of the present fragment image information if the previous fragment image information exists, determining a transparency value of the texture-mapped present fragment image information, secondarily checking existence/nonexistence of the previous fragment image information corresponding to the address of the present fragment image information, determining the depth value of the present fragment image information if the previous fragment image information exists as a result of the secondary checking, storing the determined depth value of the present fragment image information, and determining and storing a color value of the present fragment image information.

Here, the method further includes the step of stopping the input of the present fragment image information and repeatedly checking whether the previous fragment image information corresponding to the address of the present fragment image information exists if the previous fragment image information does not exist as the result of the secondary checking.

Meanwhile, the step of primarily checking the existence/nonexistence of the previous fragment image information corresponding to the address of the present fragment image information includes the steps of checking whether the address of the present fragment image information coincides with the address of the previous fragment image information referring to a tag of the address of the present fragment image information by comparing the addresses, requesting the previous fragment image information corresponding to the address of the present fragment image information if the addresses do not coincide with each other, receiving the requested previous fragment image information, and reading the depth value of the received previous fragment image information.

Here, the primary checking step further includes the step of comparing the depth value of the previous fragment image information with that of the present fragment image information if the addresses coincide with each other.

Meanwhile, the step of secondarily checking the existence/nonexistence of the previous fragment image information corresponding to the address of the present fragment image information includes the steps of checking whether the address of the present fragment image information coincides with the address of the previous fragment image information referring to a tag of the address of the present fragment image information by comparing the addresses, requesting the previous fragment image information corresponding to the address of the present fragment image information if the addresses do not coincide with each other, but coincide with each other at the primary checking step, receiving the requested previous fragment image information, and reading the depth value of the received previous fragment image information.

Here, the secondary checking step further includes the step of comparing the depth value of the previous fragment image information with that of the present fragment image information irrespective of the address coincidence at the primary checking step if the addresses coincide with each other.

Also, the step of secondarily checking the existence/nonexistence of the previous fragment image information corresponding to the address of the present fragment image information includes the steps of checking whether the address of the present fragment image information coincides with the address of the previous fragment image information referring to a tag of the address of the present fragment image information by comparing the addresses, receiving the previous fragment image information previously requested at the primary checking if the addresses do not coincide with each other, and also do not coincide with each other at the primary checking step, and reading the depth value of the received previous fragment image information.

Here, the secondary checking step further includes the step of comparing the depth value of the previous fragment image information with that of the present fragment image information irrespective of the address coincidence at the primary checking step if the addresses coincide with each other.

In another aspect of the present invention, a method of processing pixel rasterization in a 3D rendering processor includes the steps of receiving an input of present fragment image information from an outside, primarily checking existence/nonexistence of previous fragment image information corresponding to an address of the inputted present fragment image information, immediately texture-mapping the present fragment image information if the previous fragment image information does not exist as a result of the primary checking, while checking whether the previous fragment image information corresponding to the address of the inputted present fragment image information is presently in use if the previous fragment image information exists, indicating and storing a used state in the flag of the previous fragment image information if the previous fragment image information is not in use as a result of checking, texture-mapping the present fragment image information after determining a depth value of the present fragment image information, determining a transparency value of the texture-mapped present fragment image information, checking whether the depth value of the texture-mapped present fragment image information is determined, secondarily checking existence/nonexistence of the previous fragment image information corresponding to the address of the present fragment image information if the depth value of the present fragment image information is not determined as a result of checking, determining the depth value of the present fragment image information if the previous fragment image information exists as a result of the secondary checking, storing the determined depth value of the present fragment image information and simultaneously updating the used state of the corresponding address of the previous fragment image information presently used, and determining and storing a color value of the present fragment image information.

Here, the method further includes the step of stopping performing of a next operation step and repeatedly checking whether the previous fragment image information is presently in use if the previous fragment image information is in use as a result of checking whether the previous fragment image information is presently in use.

Also, the method further includes the step of storing the depth value of the determined present fragment image information if the depth value of the present fragment image information is determined as a result of checking whether the depth value of the texture-mapped present fragment image information is determined.

Also, the method further includes the step of stopping the input of the present fragment image information and repeatedly checking whether the previous fragment image information corresponding to the address of the present fragment image information exists if the previous fragment image information does not exist as the result of the secondary checking.

In still another aspect of the present invention, an apparatus for processing pixel rasterization in a 3D rendering processor includes a memory section for storing fragment image information in which a certain depth value and color value are operated in corresponding addresses, a first depth operation section for reading out from the memory section the depth value of previous fragment image information corresponding to an address of present fragment information externally inputted and operating the depth value of the present fragment image information, a texture mapping section for texture-mapping the present fragment image information, a second depth operation section for reading out from the memory section the depth value of the previous fragment image information corresponding to the address of the present fragment image information inputted from the texture mapping section and operating the depth value of the present fragment image information, a transparency operation section for operating a transparency value of the texture-mapped present fragment image information, a flag memory section for storing a flag of the previous fragment image information presently used, checking whether the previous fragment image information corresponding to the address of the present fragment image information is presently in use through the flag, and updating the flag of the used previous fragment image information, and a color operation section for operating a color value of the present fragment image information.

Here, the memory section includes a texture cache memory, and pixel cache memory or frame buffer.

The flag memory section includes a flag section for storing the flag of the previous fragment image information presently used, a flag checking section for checking whether the previous fragment image information corresponding to the address of the present fragment image information is presently in use through the flag value, of the flag section, and a flag updating section for updating the flag value of the used previous fragment image information.

Also, the apparatus according to the present invention further includes a tag section for checking whether the address of the present fragment image information inputted from the first and second depth operation sections coincides with the address of the previous fragment image information referring to the tag of the present fragment image information address by comparing the addresses, and a request section for requesting the previous fragment image information corresponding to the address of the present fragment image information if the addresses do not coincide with each other.

According to the apparatus of the present invention as constructed above, the performing of the unnecessary texture mapping can be removed, and the consistency problem can be simply and easily detected. Also, the stop of performing the pipeline due to the nonexistence of the previous fragment image information in the pixel cache memory can be greatly reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
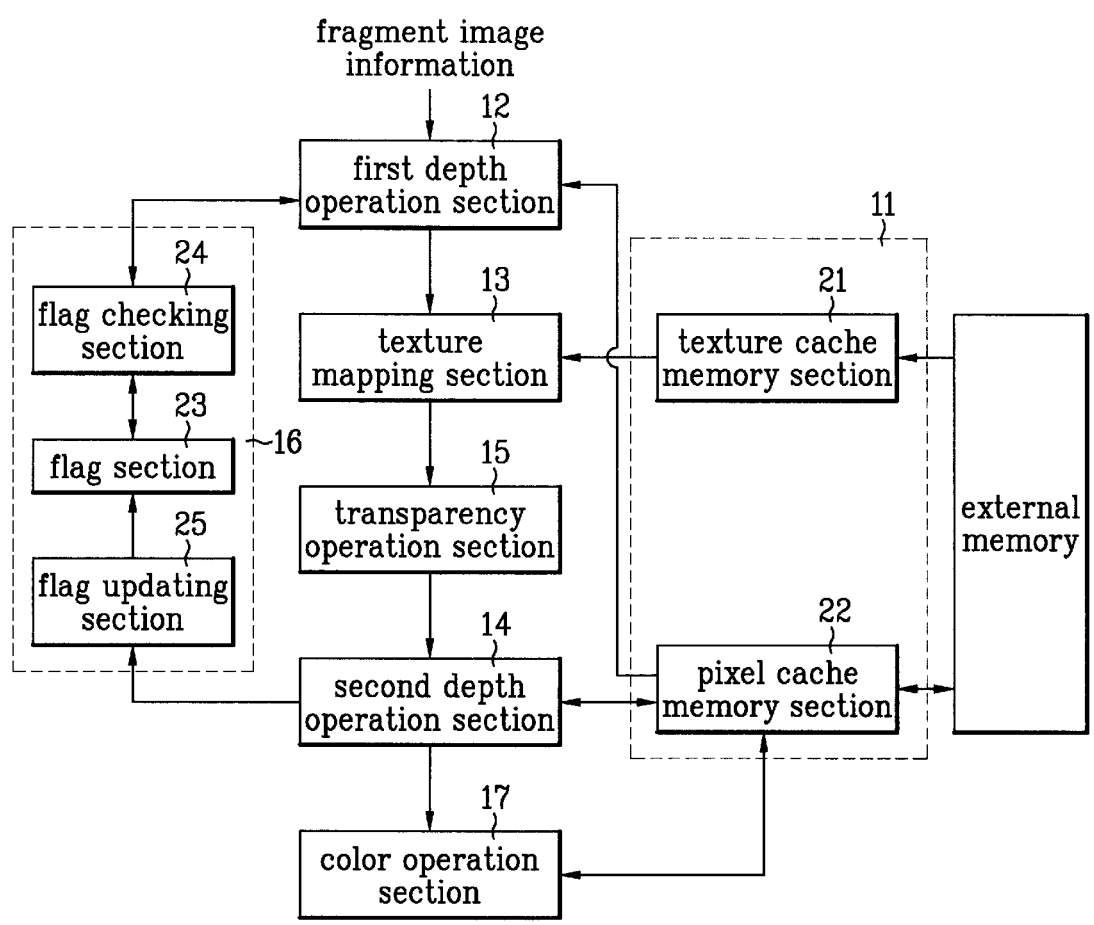
FIG. 1 is a block diagram illustrating an apparatus for processing pixel rasterization according to the present invention.

FIG. 1 is a block diagram illustrating an apparatus for processing pixel rasterization according to the present invention. Referring to FIG. 1, the apparatus according to the present invention includes a memory section 11, first depth operation section 12, texture mapping section 13, second depth operation section 14, transparency operation section 15, flag memory section 16, and color operation section 17.

Here, the memory section 11 is provided with a texture cache memory 21 and pixel cache memory 22, and the pixel cache memory may be replaced by a frame buffer (not illustrated).

Figure 4:
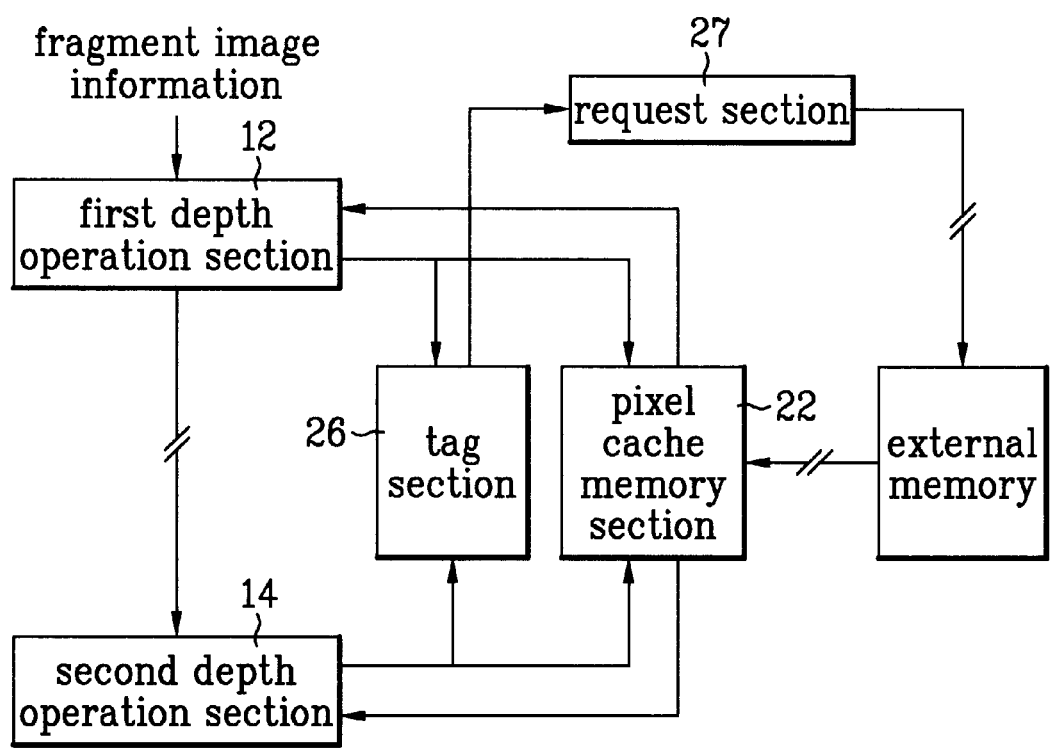
FIG. 4 is a block diagram illustrating the construction for depth reading operation according to the present invention.

Also, as shown in FIG. 4, the pixel cache memory section 22 further includes a tag section 26, and request section 27.

The flag memory section 16 is provided with a flag section 23, flag checking section 24, and flag updating section 25.

According to circumstances, the flag memory section 16 may be unnecessary, and thus may be omitted any time.

Figure 2:
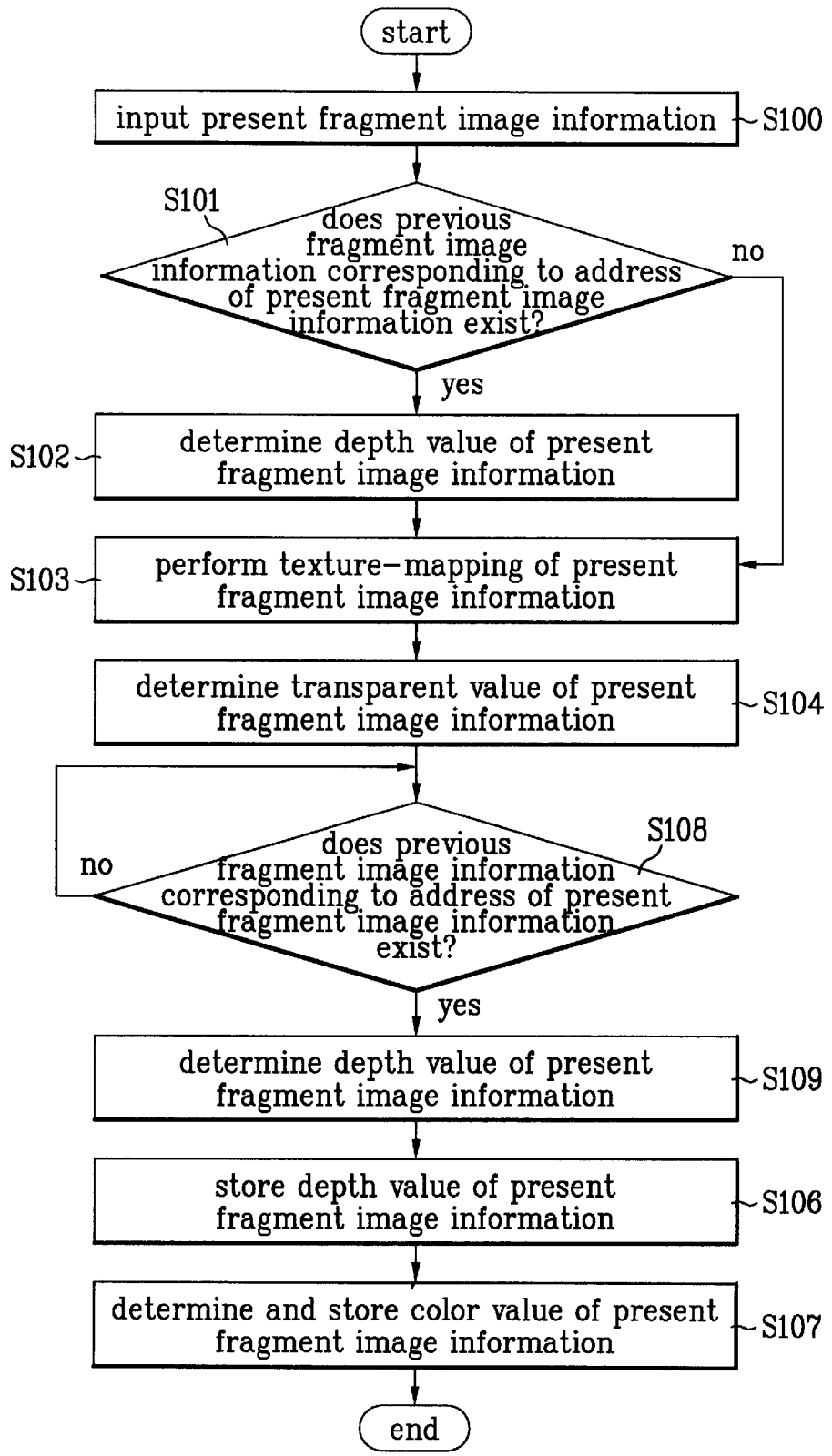
FIG. 2 is a flowchart illustrating a method of processing pixel rasterization according to a first embodiment of the present invention.

FIG. 2 is a flowchart illustrating a method of processing pixel rasterization according to a first embodiment of the present invention. This embodiment exemplifies the case that uses no flag memory section 16 illustrated in FIG. 1.

With reference to FIGS. 1 and 2, the method of processing pixel rasterization according to the first embodiment of the present invention will now be explained.

First, fragment image information is inputted from an outside (step S100).

Here, the fragment image information means the information including a color value created through interpolation, 3D positional coordinates (x,y,z), texture coordinates, etc.

If the present fragment image information is inputted from the outside, the first depth operation section 12 performs the depth reading and depth checking.

The first depth operation section 12 checks whether the previous fragment image information corresponding to the address of the present fragment image information first inputted exists in the pixel cache memory section 22 (step S101).

As a result of checking, if the previous fragment image information does not exist in the pixel cache memory section 22, the present fragment image information is inputted to the texture mapping section 13, and the texture mapping is immediately performed (step S103).

If the previous fragment image information exists in the pixel cache memory section 22, the first depth operation section 12 reads out from the pixel cache memory section 22 the corresponding previous fragment image information. This is called the depth reading.

Then, it is checked whether the present fragment image information is obscured by the previous fragment image information by comparing the depth value of the present fragment image information with that of the previous fragment image information. This is called the depth checking.

At this time, if the present fragment image information is obscured by the previous fragment image information, it is thrown away without performing the texture mapping, while otherwise, the texture mapping is performed.

Specifically, if the previous fragment image information exists in the pixel cache memory, the depth value of the present fragment image information is determined, and then the texture mapping of the present fragment image information is performed (steps S102 and S103).

Next, the transparency operation section 15 determines the transparency value of the texture-mapped present fragment image information (step S104).

Then it is checked again whether the previous fragment image information corresponding to the address of the present fragment image information exists in the pixel cache memory 22 (step S108).

At this time, if the previous fragment image information exists in the pixel cache memory 22, the second depth operation section 14 reads the depth value of the present fragment image information, and performs the depth checking (step S109). If the previous fragment image information does not exist, the input of the next fragment image information to the second depth operation section 14 is stopped, and it is repeatedly checked whether the previous fragment image information exist in the pixel cache memory 22.

In other words, at this step, the whole steps are stopped until the depth value of the previous fragment image information is read out from the pixel cache memory 22.

After the depth value of the present fragment image information determined as above is stored in the pixel cache memory 22 (step S106), the color value of the present fragment image information is determined, and then stored in the pixel cache memory 22 to complete the pixel rasterization of the present fragment image (step S107).

As described above, according to the present invention, since the depth checking of the present fragment image information is performed before the texture mapping step, the portions of the present fragment image information obscured by the previous fragment image information does not require the performing of the texture mapping, and thus the unnecessary texture mapping can be removed.

Also, according to the present invention, even if the performing of the depth reading fails in the first depth operation section 12, the depth reading is re-performed by the second depth operation section after performing the next step without stopping. Accordingly, the proceeding speed is rapid, and the stop of performing the pipeline due to the nonexistence of the previous fragment image information in the pixel cache memory can be greatly reduced.

The depth reading according to the present invention that has the above-described advantages will be explained in more detail.

FIG. 4 is a block diagram illustrating the construction for depth reading operation according to the present invention. Referring to FIG. 4, it is checked whether the address of the present fragment image information inputted from the first and second depth operation sections 12 and 14 coincides with that of the previous fragment image information in the tag section 26 by comparing the two addresses.

In the tag section 26, the addresses of the previous fragment image information are arranged by indexes in tags.

First, if the address of the present fragment image information coincides with that of the previous fragment image information, the first depth operation section 12 reads the depth value of the corresponding previous fragment image information from the pixel cache memory 22.

If the addresses do not coincide with each other, the request section 27 requests to the external frame memory the previous fragment image information corresponding to the address of the present fragment image information.

Meanwhile, if the address of the present fragment image information coincides with that of the previous fragment image information, the second depth operation section 14 reads the depth value of the corresponding previous fragment image information from the pixel cache memory 22 irrespective of the reading of the depth value of the previous fragment image information of the first depth operation section 12.

However, if the addresses do not coincide with each other in the second depth operation section 14 and the first depth operation section 12 performs the reading of the depth value, the request section 27 requests to the external frame memory the previous fragment image information corresponding to the present fragment image information.

Meanwhile, if the addresses do not coincide with each other in the second depth operation section 14 and the first depth operation section 12 cannot perform the reading of the depth value, the second depth operation section 14 waits for the transmission of the previous fragment image information previously requested at the reading step of the first depth operation section 12 from the external memory.

The frame memory transmits the requested previous fragment image information to the pixel cache memory 22, and the pixel cache memory 22 outputs the depth value of the transmitted previous fragment image information to the first and second depth operation sections 12 and 14.

This series of processes is performed simultaneously with the pipeline process between the first and second depth operation sections in the pixel rasterization process, and thus the system performance is improved.

Figure 3:
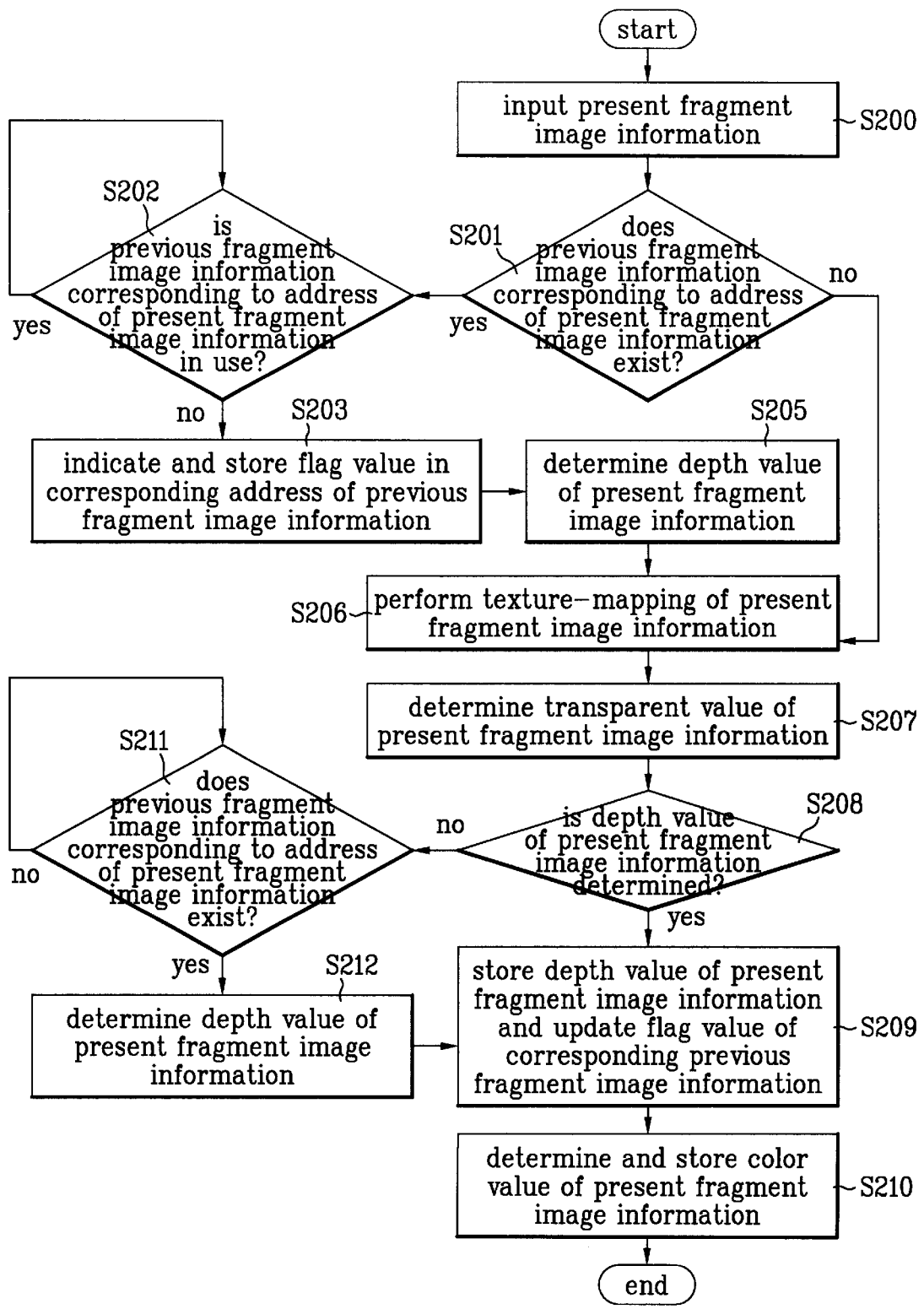
FIG. 3 is a flowchart illustrating a method of processing pixel rasterization according to a second embodiment of the present invention.

FIG. 3 is a flowchart illustrating a method of processing pixel rasterization according to a second embodiment of the present invention. This embodiment uses the flag memory 16 illustrated in FIG. 1.

First, if the fragment image information is inputted from the outside (step S200), the first depth operation section 12 checks whether the previous fragment image information corresponding to the address of the inputted present fragment image information exists in the pixel cache memory section 22 (step S201).

As a result of checking, if the previous fragment image information does not exist in the pixel cache memory section 22, the present fragment image information is inputted to the texture mapping section 13, and the texture mapping is immediately performed (step S206).

If the previous fragment image information exists in the pixel cache memory section, the flag checking section 24 in the flag memory 16 checks whether the previous fragment image information corresponding to the address of the inputted present fragment image information is presently in use (step S202).

As a result of checking, if the previous fragment image information is not in use, the flag checking section 24 indicates and stores a used state in the flag (corresponding address) of the previous fragment image information (step S203).

For example, if the previous fragment image information is not presently in use, the flag value of the previous fragment image information in the flag section 23 is represented as '0', while if the previous fragment image information is presently in use, the flag value is represented as '1'.

Specifically, if the flag value is '0' during the flag checking, it means that the consistency problem does not occur, while if the flag value is '1', the consistency problem occurs.

Accordingly, at step S202, if the flag value of the previous fragment image information is '0', it means that the previous fragment image information is not in use, and '1' is stored as the flag value of the previous fragment image information in the flag section 23 to indicate that the previous fragment information is presently in use (step S203).

However, at step 202, if the flag value of the previous fragment image information is '1', it means that the previous fragment image information is presently in use, and it is repeatedly checked whether the previous fragment image information is in use and the performing of the next step is stopped.

After step S203, the first depth operation section 12 reads the depth value of the corresponding previous fragment image information from the pixel cache memory section 22.

Thereafter, it is checked whether the present fragment image information is obscured by the previous fragment image information by comparing the depth value of the present fragment image information with that of the previous fragment image information.

At this time, if the present fragment image information is obscured by the previous fragment image information, it is thrown away without performing the texture mapping, while otherwise, the texture mapping is performed (steps S205 and S206).

Next, the transparency operation section 15 determines the transparency value of the texture-mapped present fragment image information (step S207).

The second depth operation section 14 checks whether the depth value of the texture-mapped present fragment image information has already been determined by the first depth operation section 12 (step S208).

If the depth value of the present fragment image information has been determined as a result of checking, the determined depth value of the respective image information is stored in the pixel cache memory 22, and the flag value of the used previous fragment image information is updated to '0' by the flag updating section 25 (step S209).

If the depth value of the present fragment image information has not been determined, it is checked again whether the previous fragment image information corresponding to the address of the present fragment image information exists in the pixel cache memory 22 (step S211).

The following steps S212, S213, and S210 are the same as those of the first embodiment, and thus the detailed explanation thereof will be omitted.

As described above, the second embodiment of the present invention can solve the consistency problem using the flag memory 16.

If the depth value of the present fragment image information is determined, it is possible to immediately store the depth value to the pixel cache memory (steps S208 and S209).

Meanwhile, the flag memory 16 according to the present invention requires 1/64 of the pixel cache memory 22 in capacity in case that the depth value for one pixel is of 32 bits and the color value is of 32 bits.

For example, in case of the pixel cache memory of about 64K bytes, the flag memory requires about 1K bytes in capacity.

Also, according to the present invention, the frame buffer can be used in the chip in place of the pixel cache memory.

At this time, the size of the flag memory for detecting the consistency problem is as large as the number of pixels existing in the frame buffer.

As described above, the present invention has the following effects.

First, since the primary depth checking is performed before the performing of the texture mapping, the unnecessary performing of the texture mapping can be removed.

Second, the consistency problem can be simply and easily solved using the flag memory.

Third, by performing the depth reading and depth checking twice, the stop of performing the pipeline due to the nonexistence of the previous fragment image information in the pixel cache memory can be greatly reduced.

Accordingly, the present invention is very effective in cost, performance, and power consumption.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of processing pixel rasterization in a three-dimensional (3D) rendering processor comprising the steps of:

receiving an input of present fragment image information from an outside;

primarily checking existence/nonexistence of previous fragment image information corresponding to an address of the inputted present fragment image information;

immediately texture-mapping the present fragment image information if the previous fragment image information does not exist as a result of the primary checking, while texture-mapping the present fragment image information after determining a depth value of the present fragment image information if the previous fragment image information exists;

determining a transparency value of the texture-mapped present fragment image information;

secondarily checking existence/nonexistence of the previous fragment image information corresponding to the address of the present fragment image information;

determining the depth value of the present fragment image information if the previous fragment image information exists as a result of the secondary checking;

storing the determined depth value of the present fragment image information; and determining and storing a color value of the present fragment image information.

2. The method as claimed in claim 1, further comprising the step of stopping the input of the present fragment image information, and repeatedly checking whether the previous fragment image information corresponding to the address of the present fragment image information exists if the previous fragment image information does not exist as the result of the secondary checking.

3. The method as claimed in claim 1, wherein the step of primarily checking the existence/nonexistence of the previous fragment image information corresponding to the address of the present fragment image information comprises the steps of:

checking whether the address of the present fragment image information coincides with the address of the previous fragment image information referring to a tag of the address of the present fragment image information by comparing the addresses;

requesting the previous fragment image information corresponding to the address of the present fragment image information if the addresses do not coincide with each other;

receiving the requested previous fragment image information; and reading the depth value of the received previous fragment image information.

4. The method as claimed in claim 1, wherein the primary checking step further comprises the step of comparing the depth value of the previous fragment image information with that of the present fragment image information if the addresses coincide with each other.

5. The method as claimed in claim 1, wherein the step of secondarily checking the existence/nonexistence of the previous fragment image information corresponding to the address of the present fragment image information comprises the steps of:

checking whether the address of the present fragment image information coincides with the address of the previous fragment image information referring to a tag of the address of the present fragment image information by comparing the addresses;

requesting the previous fragment image information corresponding to the address of the present fragment image information if the addresses do not coincide with each other, but coincide with each other at the primary checking step;

receiving the requested previous fragment image information; and reading the depth value of the received previous fragment image information.

6. The method as claimed in claim 5, wherein the secondary checking step further comprises the step of comparing the depth value of the previous fragment image information with that of the present fragment image information irrespective of the address coincidence at the primary checking step if the addresses coincide with each other.

7. The method as claimed in claim 1, wherein the step of secondarily checking the existence/nonexistence of the previous fragment image information corresponding to the address of the present fragment image information comprises the steps of:

checking whether the address of the present fragment image information coincides with the address of the previous fragment image information referring to a tag of the address of the present fragment image information by comparing the addresses;

receiving the previous fragment image information previously requested at the primary checking if the addresses do not coincide with each other, and also do not coincide with each other at the primary checking step; and reading the depth value of the received previous fragment image information.

8. The method as claimed in claim 7, wherein the secondary checking step further comprises the step of comparing the depth value of the previous fragment image information with that of the present fragment image information irrespective of the address coincidence at the primary checking step if the addresses coincide with each other.

9. A method of processing pixel rasterization in a three-dimensional (3D) rendering processor comprising the steps of:

receiving an input of present fragment image information from an outside;

primarily checking existence/nonexistence of previous fragment image information corresponding to an address of the inputted present fragment image information, immediately texture-mapping the present fragment image information if the previous fragment image information does not exist as a result of the primary checking, while checking whether the previous fragment image information corresponding to the address of the inputted present fragment image information is presently in use if the previous fragment image information exists;

indicating and storing a used state in the flag of the previous fragment image information if the previous fragment image information is not in use as a result of checking;

texture-mapping the present fragment image information after determining a depth value of the present fragment image information;

determining a transparency value of the texture-mapped present fragment image information;

checking whether the depth value of the texture-mapped present fragment image information is determined;

secondarily checking existence/nonexistence of the previous fragment image information corresponding to the address of the present fragment image information if the depth value of the present fragment image information is not determined as a result of checking;

determining the depth value of the present fragment image information if the previous fragment image information exists as a result of the secondary checking;

storing the determined depth value of the present fragment image information and simultaneously updating the used state of the corresponding address of the previous fragment image information presently used; and determining and storing a color value of the present fragment image information.

10. The method as claimed in claim 9, further comprising the step of stopping performing of a next operation step and repeatedly checking whether the previous fragment image information is presently in use if the previous fragment image information is in use as a result of checking whether the previous fragment image information is presently in use.

11. The method as claimed in claim 9, further comprising the step of storing the depth value of the determined present fragment image information if the depth value of the present fragment image information is determined as a result of checking whether the depth value of the texture-mapped present fragment image information is determined.

12. The method as claimed in claim 9, further comprising the step of stopping the input of the present fragment image information and repeatedly checking whether the previous fragment image information corresponding to the address of the present fragment image information exists if the previous fragment image information does not exist as the result of the secondary checking.

13. The method as claimed in claim 9, wherein the step of checking the existence/nonexistence of the previous fragment image information corresponding to the address of the present fragment image information comprises the steps of:

checking whether the address of the present fragment image information coincides with the address of the previous fragment image information referring to a tag of the address of the present fragment image information by comparing the addresses;

requesting the previous fragment image information corresponding to the address of the present fragment image information if the addresses do not coincide with each other;

receiving the requested previous fragment image information; and reading the depth value of the received previous fragment image information.

14. The method as claimed in claim 13, wherein the checking step further comprises the step of comparing the depth value of the previous fragment image information with that of the present fragment image information if the addresses coincide with each other.

15. An apparatus for processing pixel rasterization in a three-dimensional (3D) rendering processor comprising:

a memory section for storing fragment image information in which a certain depth value and color value are operated in corresponding addresses, wherein the memory section comprises a texture cache memory, and pixel cache memory or frame buffer;

a first depth operation section for reading out from the memory section the depth value of previous fragment image information corresponding to an address of present fragment information externally inputted, and operating the depth value of the present fragment image information;

a texture mapping section for texture-mapping the present fragment image information;

a second depth operation section for reading out from the memory section the depth value of the previous fragment image information corresponding to the address of the present fragment image information inputted from the texture mapping section, and operating the depth value of the present fragment image information, a transparency operation section for operating a transparency value of the texture-mapped present fragment image information;

a flag memory section for storing a flag of the previous fragment image information presently used, checking whether the previous fragment image information corresponding to the address of the present fragment image information is presently in use through the flag, and updating the flag of the used previous fragment image information; and a color operation section for operating a color value of the present fragment image information.

16. The apparatus as claimed in claim 15, wherein the flag memory section comprises:

a flag section for storing the flag of the previous fragment image information presently used;

a flag checking section for checking whether the previous fragment image information corresponding to the address of the present fragment image information is presently in use through the flag value of the flag section; and a flag updating section for updating the flag value of the used previous fragment image information.

17. The apparatus as claimed in claim 15, further comprising:

a tag section for checking whether the address of the present fragment image information inputted from the first and second depth operation sections coincides with the address of the previous fragment image information referring to the tag of the present fragment image information address by comparing the addresses; and a request section for requesting the previous fragment image information corresponding to the address of the present fragment image information if the addresses do not coincide with each other.

* * * * *